United States Patent
Popescu-Stanesti et al.

(10) Patent No.: US 8,098,469 B2
(45) Date of Patent: Jan. 17, 2012

(54) ELECTRICITY DELIVERY SYSTEM

(75) Inventors: Vlad Mihail Dan Popescu-Stanesti, San Jose, CA (US); Laszlo Lipcsei, Campbell, CA (US)

(73) Assignee: O2Micro Inc., Santa Clara, CA (US)

( * ) Notice: Subject to any disclaimer, the term of this patent is extended or adjusted under 35 U.S.C. 154(b) by 362 days.

(21) Appl. No.: 12/418,269

(22) Filed: Apr. 3, 2009

(65) Prior Publication Data
US 2009/0262478 A1  Oct. 22, 2009

Related U.S. Application Data

(60) Provisional application No. 61/124,385, filed on Apr. 16, 2008.

(51) Int. Cl.
*H02H 3/20* (2006.01)
(52) U.S. Cl. ........ 361/91.1; 361/91.6; 361/18; 361/100; 361/111; 323/265; 323/274; 307/10.1
(58) Field of Classification Search .................. 361/91.1, 361/91.6, 18, 100, 111; 323/265, 274; 307/10.1
See application file for complete search history.

(56) References Cited

U.S. PATENT DOCUMENTS

| | | | | |
|---|---|---|---|---|
| 3,582,713 | A * | 6/1971 | Till | 361/79 |
| 4,899,098 | A * | 2/1990 | Gariboldi | 323/277 |
| 6,111,737 | A * | 8/2000 | Baldwin et al. | 361/91.1 |
| 6,201,375 | B1 * | 3/2001 | Larson et al. | 323/277 |
| 7,521,986 | B2 | 4/2009 | Mitsuda | |
| 2005/0047032 | A1* | 3/2005 | Kanayama et al. | 361/18 |
| 2007/0255460 | A1* | 11/2007 | Lopata | 700/293 |
| 2008/0218144 | A1* | 9/2008 | Nishida | 323/285 |

FOREIGN PATENT DOCUMENTS

| | | |
|---|---|---|
| CN | 1922785 A | 2/2007 |
| CN | 101098136 A | 1/2008 |

* cited by examiner

*Primary Examiner* — Patrick Salce

(57) ABSTRACT

An electronic system can include a switch and a regulator coupled to the switch. The switch can be used to deliver electricity from a first terminal to a second terminal. The switch can also be used to prevent the second terminal from having a level that is higher than a predefined operation level limit by controlling the status of the switch according to a supply signal at the first terminal. The regulator can be used to adjust a regulated signal at the second terminal according to the supply signal.

22 Claims, 4 Drawing Sheets

ELECTRICITY DELIVERY SYSTEM

RELATED APPLICATION

This application claims priority to U.S. Provisional Application No. 61/124,385, filed on Apr. 16, 2008, which is hereby incorporated by reference in its entirety.

BACKGROUND

In some conventional automotive applications, a voltage power supply which presents high voltage spikes (e.g., 36V) may be used to power an automotive system. The automotive system may include some integrated circuits which operate at a normal operation voltage level (e.g., 14.4V) that is lower than the high voltage spikes' level (e.g., 36V). It might be undesirable to apply high voltage spikes (e.g., 36V) to the integrated circuits that are rated to lower voltages. Therefore, these integrated circuits may need to have a maximum operation voltage level that is no lower than the high voltage spikes' level (e.g., 36V) for circuit protection purposes. Such integrated circuits can be costly, and such automotive systems have relatively high power consumption and relatively low power efficiency.

SUMMARY

In one embodiment, an electronic system includes a switch and a regulator coupled to the switch. The switch can be used to deliver electricity from a first terminal to a second terminal. The switch can also prevent the second terminal from exceeding a predefined (e.g., maximum) operation level limit by controlling the status of the switch according to a supply signal at the first terminal. The regulator can be used to adjust a regulated signal at the second terminal according to the supply signal.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

DETAILED DESCRIPTION

Figure 1A:
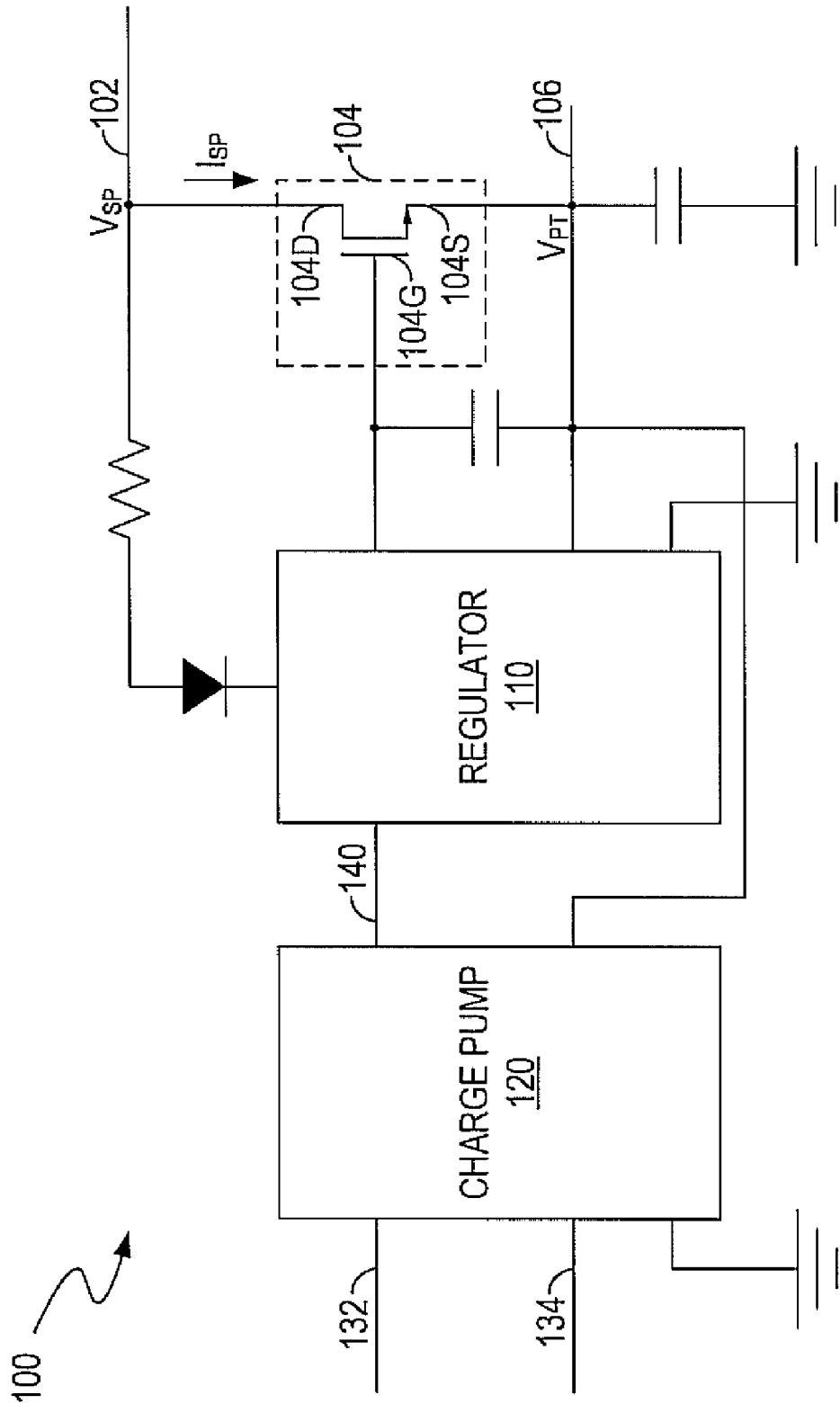
FIG. 1A illustrates a block diagram of an example of an electricity delivery system, in accordance with one embodiment of the present invention.

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Embodiments described herein may be discussed in the general context of computer-executable instructions residing on some form of computer-usable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments. Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "delivering," "adjusting," "controlling," "preventing," "generating" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

In one embodiment, the present invention provides an electricity delivery system that can deliver electricity (e.g., a supply current, a supply voltage) to power one or more integrated circuits. For example, the electricity delivery system can receive a supply signal from a power supply terminal and output a regulated signal on a protected terminal coupled to the integrated circuits. In one such embodiment, if the supply signal is at a normal operation level of the integrated circuits, the level of the regulated signal can be approximately equal to the level of the supply signal. As such, the integrated circuits can operate properly at the normal operation level. If the supply signal is at a relatively high level that is higher than a maximum operation level of the integrated circuits, the regulated signal can be regulated at a predetermined level that is lower than the maximum operation level, e.g., at the normal operation level. As such, the integrated circuits can also operate properly.

FIG. 1A illustrates a block diagram of an example of an electricity delivery system 100, in accordance with one embodiment of the present invention. The electricity delivery system 100 can be coupled between a first terminal 102 and a second terminal 106. The first terminal 102 can be coupled to a power source (not shown in FIG. 1A) and receive a supply signal, e.g., a supply voltage $V_{SP}$, from the power source. The second terminal 106 can be coupled to one or more circuits, e.g., integrated circuits (not shown in FIG. 1A), and provide a regulated signal, e.g., a regulated voltage $V_{PT}$, to the integrated circuits. The integrated circuits can have a maximum operation level, e.g., a maximum operation voltage level $V_{MAX}$. Advantageously, the electricity delivery system 100 can provide the regulated voltage $V_{PT}$ to power the integrated circuits, and meanwhile can prevent high voltage spikes, e.g., voltage levels higher than the maximum operation level $V_{MAX}$, at the second terminal 106 so as to protect the integrated circuits.

More specifically, the electricity delivery system 100 can include a switch 104 that delivers electricity, e.g., a supply current $I_{SP}$, from the first terminal 102 (hereinafter power supply terminal 102) to the second terminal 106 (hereinafter protected terminal 106). The switch 104 can also be used to prevent the protected terminal 106 from exceeding a level that is higher than a predefined operation level limit (e.g., the maximum operation level $V_{MAX}$) by controlling a status of the switch 104 according to the supply signal $V_{SP}$ at the power supply terminal 102. Furthermore, the electricity delivery system 100 can include a regulator 110 coupled to the switch 104 to adjust the regulated signal $V_{PT}$ at the protected terminal 106 according to the supply signal $V_{SP}$.

For example, the switch 104 can be, but is not limited to, a MOSFET (metal oxide semiconductor field effect transistor). In one embodiment, the switch 104 can have a gate 104G coupled to a charge pump 120, a drain 104D coupled to the power supply terminal 102, and a source 104S coupled to the protected terminal 106. If the supply voltage $V_{SP}$ is at a normal operation level $V_{NOR}$ of the integrated circuits ($V_{NOR} < V_{MAX}$), a gate-source voltage $V_{104GS}$ of the switch 104 and a gate-drain voltage $V_{104GD}$ of the switch 104 can be greater than a threshold voltage $V_T$ of the switch 104. In one embodiment, the voltages $V_{104GS}$ and $V_{104GD}$ can be greater than a fully turn-on voltage $V_F$ of the switch 104. As such, the switch 104 can be fully turned on and the regulated voltage level $V_{PT}$ can be approximately equal to the supply voltage level $V_{SP}$. When the integrated circuits are powered by a voltage at the normal operation level $V_{NOR}$, the integrated circuits can operate properly. If the supply voltage level $V_{SP}$ is relatively high, e.g., higher than the maximum operation level $V_{MAX}$ of the integrated circuits, the gate-source voltage $V_{104GS}$ can be greater than the threshold voltage $V_T$ and the gate-drain voltage $V_{104GD}$ can be less than the threshold voltage $V_T$. As such, the switch 104 can operate in the active (saturation) region. Meanwhile the regulator 110 can adjust the regulated voltage $V_{PT}$ to a predetermined level $V_{PRE1}$. In one embodiment, the predetermined level $V_{PRE1}$ is equal to the normal operation level $V_{NOR}$ of the integrated circuits. As such, the drain-source voltage $V_{104DS}$ of the switch 104 can be equal to the supply voltage level $V_{SP}$ minus the predetermined level $V_{PRE1}$, e.g., $V_{104DS} = V_{SP} - V_{PRE1}$. As a result, the switch 104 can be used to prevent relatively high level signals at the protected terminal 106.

In other words, in one embodiment, when the level of the supply voltage $V_{SP}$ is lower than a predetermined level $V_{PRE2}$, the switch 104 can be fully turned on, and therefore the level of the regulated voltage $V_{PT}$ can be approximately equal to the level of the supply voltage $V_{PT}$. The predetermined level $V_{PRE2}$ can be equal to the maximum operation level $V_{MAX}$ of the integrated circuits. In addition, when the level of the supply voltage $V_{SP}$ is higher than the predetermined level $V_{PRE2}$, the switch 104 can operate in the active (saturation) region as a dynamic resistor, and the regulator 110 can adjust the regulated voltage $V_{PT}$ to a level that is no higher than the maximum operation level $V_{MAX}$. For example, the regulator 110 can adjust the regulated voltage $V_{PT}$ to the normal operation level $V_{NOR}$ of the integrated circuits.

Advantageously, if a voltage spike (e.g., 36V) at a level that is higher than the maximum operation level (e.g., 16V, 20V) of the integrated circuits occurs at the power supply terminal 102, the integrated circuits can also operate properly. As such, in one embodiment, integrated circuits having a maximum operation voltage level (e.g., 16V, 20V) that is lower than the level of the voltage spike (e.g., 36V) can still be used in some applications (e.g., automotive applications), to reduce the cost and power consumption, and to also increase the power efficiency.

In one embodiment, the electricity delivery system 100 further includes a charge pump 120 coupled to the protected terminal 106. The charge pump 120 can generate a driving signal 140 to control the switch 104 according to the regulated signal at the protected terminal 106. For example, the charge pump 120 can receive the regulated voltage $V_{PT}$, an input signal 132 and a pulse signal 134 including a plurality of pulses, and can then generate the driving signal 140 having a voltage level $V_{DR}$ that is higher than the regulated voltage level $V_{PT}$ plus the threshold voltage level $V_T$ of the switch 104, e.g., $V_{DR} > V_{PT} + V_T$. As such, the gate-source voltage $V_{104GS}$ of the switch 104 can be greater than the threshold voltage $V_T$ of the switch 104, and the switch 104 can be turned on.

Figure 1B:
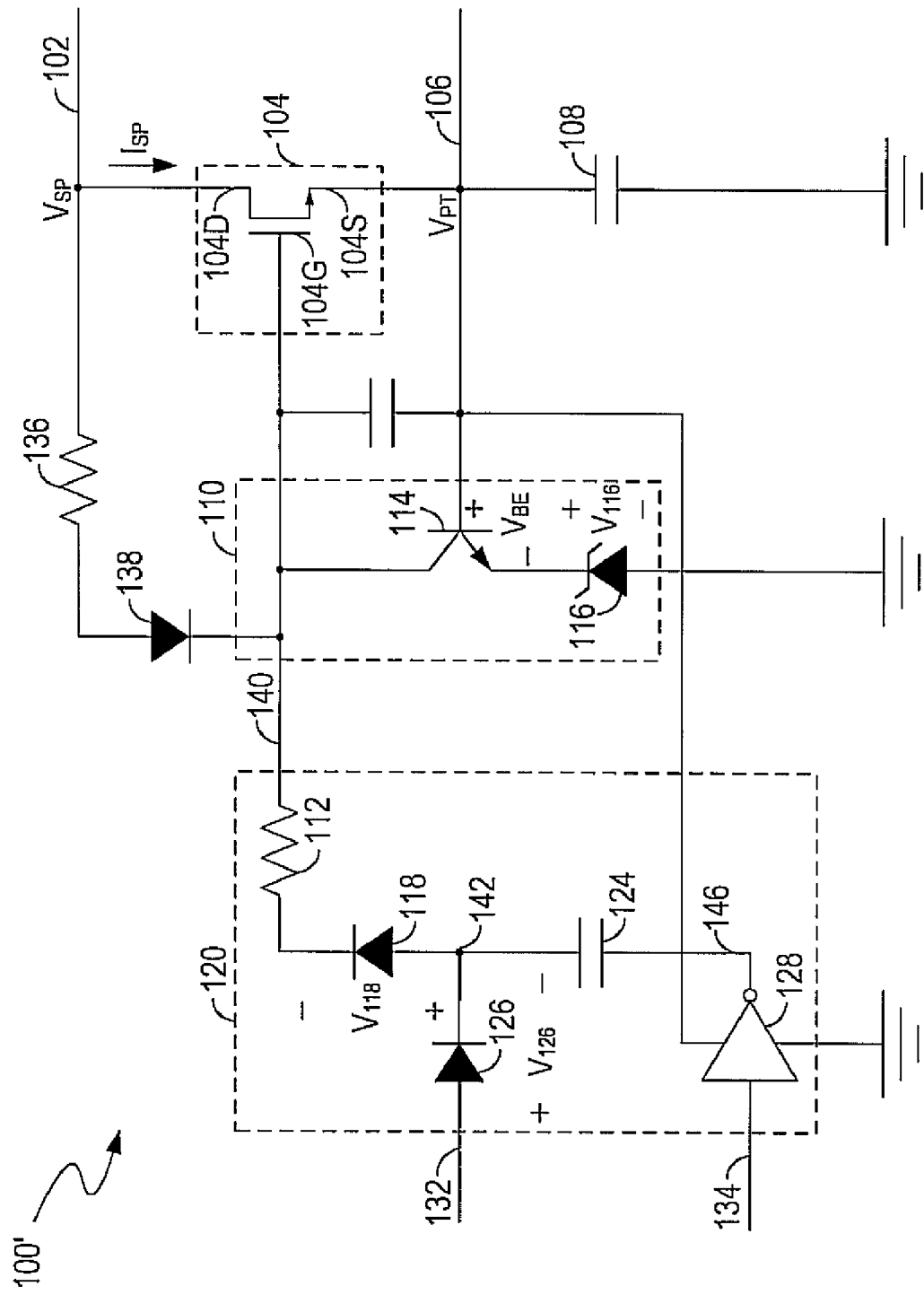
FIG. 1B illustrates a detailed circuit diagram of an example of an electricity delivery system, in accordance with one embodiment of the present invention.

FIG. 1B illustrates a detailed circuit diagram of an example of an electricity delivery system 100', in accordance with one embodiment of the present invention. Elements that are labeled the same as in FIG. 1A have similar functions and will not be repetitively described herein.

As shown in FIG. 1B, the regulator 110 can include a zener diode 116. In one embodiment, when the supply voltage level $V_{SP}$ is higher than the predetermined level $V_{PRE2}$, the zener diode 116 can be used to adjust the regulated signal $V_{PT}$ to a substantially constant level that is no higher than the maximum operation level $V_{MAX}$. In one embodiment, the zener diode 116 is coupled between ground and the protected terminal 106 via a transistor 114 (e.g., an NPN transistor). The collector terminal of the transistor 114 can be coupled to the power supply terminal 102 via a diode 138 and a resistor 136, the base terminal of the transistor 114 can be coupled to the protected terminal 106, and the emitter terminal of the transistor 114 can be coupled to ground via the zener diode 116.

In one embodiment, when the switch 104 is conducted, a capacitor 108 coupled between the protected terminal 106 and ground can be charged by the supply current $I_{SP}$. In one embodiment, if the supply voltage $V_{SP}$ is no greater than a base-emitter voltage $V_{BE}$ (e.g., 0.7V) of the transistor 114 plus an inverse breakdown voltage $V_{116}$ of the zener diode 116 ($V_{SP} \leq V_{BE} + V_{116}$), and the switch 104 is fully turned on, the regulated voltage $V_{PT}$ at the protected terminal 106 can be approximately equal to the supply voltage $V_{SP}$. In one such embodiment, the zener diode 116 is cutoff. In one embodiment, according to the characteristics of the zener diode 116 and the transistor 114, if the supply voltage $V_{SP}$ is greater than the base-emitter voltage $V_{BE}$ plus the inverse breakdown voltage $V_{116}$ ($V_{SP} > V_B + V_{116}$), and the switch 104 is conducted, the regulated voltage $V_{PT}$ at the protected terminal 106 can be maintained at a level that is equal to the base-emitter voltage $V_{BE}$ plus the inverse breakdown voltage $V_{116}$ ($V_{PT} = V_{BE} + V_{116}$). In one such embodiment, the zener diode 116 is conducted inversely.

Advantageously, the inverse breakdown voltage $V_{116}$ of the zener diode 116 can be adjusted, such that the voltage level $V_{BE}+V_{116}$ can be designed to be no higher than the maximum operation level $V_{MAX}$ (e.g., 16V, 20V) of the integrated circuits. In other words, the regulated voltage $V_{PT}$ can be maintained (regulated) at a normal operation level $V_{NOR}$ (e.g., 14.4V, 15V) of the integrated circuits. Furthermore, when the zener diode 116 is conducted, the circuit that includes the transistor 114 and the zener diode 116 can function as a negative feedback circuit, such that the voltage perturbations on the protected terminal 106 can be reduced. For example, if there is a small positive voltage fluctuation $\Delta V_{PT}$ on the protected terminal 106 ($\Delta V_{PT}>0$), the collector terminal current $I_C$ of the transistor 114 can increase by a current increment $\Delta I_C$ and the gate voltage $V_{104G}$ of the gate 104G can decrease by a voltage decrement $\Delta V_{104G}$. As a result, the regulated voltage $V_{PT}$ can decrease. Therefore, the voltage fluctuation $\Delta V_{PT}$ on the protected terminal 106 can be reduced.

The charge pump 120 can include a diode 126 that receives an input signal 132 (e.g., a voltage signal at a level $V_{132}$), a power inverter 128 that receives a pulse signal 134 including a plurality of pulses, and a capacitor 124 coupled between the output terminal 142 of the diode 126 and the output terminal 146 of the power inverter 128. When the level of the pulse signal 134 is high, the power inverter 128 can output a signal that is ground at the terminal 146. As such, the capacitor 124 can be charged by a voltage $V_{CHG}$ that is equal to the level $V_{132}$ of the input signal 132 minus a forward bias conducting voltage $V_{126}$ of the diode 126 ($V_{CHG}=V_{132}-V_{126}$). As shown in FIG. 1B, the power inverter 128 can be powered by the regulated voltage $V_{PT}$. Therefore, when the level of the pulse signal 134 is low, the power inverter 128 can output a signal at the terminal 146, which is at the regulated voltage level $V_{PT}$. At this moment, the voltage level at the terminal 142 can be equal to the voltage across the capacitor 124 plus the voltage level $V_{PT}$ at the terminal 146. In addition, the diode 126 can be cut off.

As a result, a voltage signal $V_{142}$ at the terminal 142 can have two voltage levels $V_{142}'$ and $V_{142}''$ alternately depending on the state of the pulse signal 134. More specifically, when the level of the pulse signal 134 is high, the voltage level $V_{142}'$ can be equal to $V_{CHG}$ ($V_{142}'=V_{CHG}=V_{132}-V_{126}$). When the level of the pulse signal 134 is low, the voltage level $V_{142}''$ can be equal to the regulated voltage level $V_{PT}$ plus $V_{CHG}$ ($V_{142}''=V_{PT}+V_{CHG}=V_{PT}+V_{132}-V_{126}$).

In one embodiment, the gate 104G of the switch 104 can be coupled to the terminal 142 via a resistor 112 and a diode 118, such that the switch 104 can be controlled by the driving signal 140 generated from the charge pump 120. In one embodiment, during normal operation, the voltage level $V_{142}'$ can be lower than the gate voltage level $V_{104G}$ of the gate 104G, and the voltage level $V_{142}''$ can be higher than the supply voltage level $V_{SP}$. If the voltage signal $V_{142}$ on the terminal 142 is at the voltage level $V_{142}''$ ($V_{142}''=V_{PT}+V_{126}$), the gate capacitor of the gate 104G can be charged by the voltage $V_{142}''$ via the diode 118 and the resistor 112. If the voltage signal $V_{142}$ is at the voltage level $V_{142}'$ ($V_{142}'=V_{132}-V_{126}$), the gate voltage $V_{104G}$ can be kept constant. This is because, during normal operation, the voltage level $V_{PT}$ at the protected terminal 106 can be lower than the voltage level $V_{BE}+V_{116}$, such that the zener diode 116 is cut off. In addition, the gate voltage $V_{104G}$ can be greater than the supply voltage level $V_{SP}$, such that the diode 138 can be cut off. Furthermore, the gate voltage $V_{104G}$ can be greater than the voltage $V_{142}'$, such that the diode 118 can be cut off. Accordingly, the gate capacitor of the gate 104G can be charged by the voltage $V_{142}''$ periodically.

More specifically, in one embodiment, when the switch 104 is conducted, the capacitor 108 can be charged by the supply current $I_{SP}$, and the voltage $V_{PT}$ on the protected terminal 106 can increase, so does the voltage $V_{142}''$ ($V_{142}''=V_{PT}+V_{132}-V_{126}$). If the voltage $V_{142}''$ is less than the supply voltage $V_{SP}$, and the gate voltage $V_{104G}$ is also less than the supply voltage $V_{SP}$, the capacitor of the gate 104G can be charged only by the supply voltage $V_{SP}$. If the voltage $V_{142}''$ increases to greater than the supply voltage $V_{SP}$, and the gate voltage $V_{104G}$ is less than the supply voltage $V_{SP}$, the capacitor of the gate 104G can be charged by the voltage $V_{142}''$ and the supply voltage $V_{SP}$ alternately depending on the state of the pulse signal 134. When the gate voltage $V_{104G}$ increases to greater than the supply voltage $V_{SP}$, the capacitor of the gate 104G can be charged only by the voltage $V_{142}''$ periodically.

Consequently, during normal operation, the gate voltage $V_{104G}$ can be approximately equal to the voltage level $V_{142}''$ minus a forward bias conducting voltage $V_{118}$ of the diode 118 ($V_{104G}=V_{PT}+V_{132}-V_{126}-V_{118}$), in one embodiment. In one such embodiment, the current flowing through the resistor 112 can be substantially zero, such that the voltage across the resistor 112 is relatively low and can be omitted.

Advantageously, the voltage level $V_{132}$ of the input signal 132 can be adjusted, such that the gate-source voltage $V_{104GS}$ ($V_{104GS}=V_{104G}-V_{PT}=V_{132}-V_{126}-V_{118}$) can be greater than the threshold voltage $V_T$ of the switch 104 ($V_{132}-V_{126}-V_{118}>V_T$), in one embodiment. The gate-source voltage $V_{104GS}$ can also be greater than the fully turn-on voltage $V_F$ of the switch 104, in one embodiment. In other words, the charge pump 120 can generate the driving signal 140 according to the regulated signal $V_{PT}$ to (fully) turn on the switch 104.

In operation, when the electricity delivery system 100' is powered on, the regulated voltage $V_{PT}$ at the protected terminal 106 can be low (e.g., 0V). In one embodiment, the supply voltage $V_{SP}$ from the power supply terminal 102 can be equal to the normal operation voltage $V_{NOR}$ (e.g., 14.4V), such that the switch 104 can be turned on by the supply voltage $V_{SP}$ via the resistor 136 and the diode 138, and can operate in the active region. As such, the capacitor 108 can be charged by the supply voltage $V_{SP}$ via the switch 104, and the regulated voltage level $V_{PT}$ can increase.

Concurrently, the voltage level $V_{142}''$ ($V_{142}''=V_{PT}+V_{132}-V_{126}$) at the terminal 142 can also increase until the regulated voltage $V_{PT}$ reaches a level that is equal to the supply voltage level $V_{SP}$. At this moment, the switch 104 can operate in the Ohmic (triode) region and be fully turned on by the charge pump 120. Therefore, the regulated voltage level $V_{PT}$ can be approximately equal to the supply voltage level $V_{SP}$. As such, the aforementioned integrated circuits can operate at the normal operation level $V_{NOR}$ (e.g., 14.4V). In one embodiment, during normal operation, the regulated voltage level $V_{PT}$ can be lower than the voltage level $V_{BE}+V_{116}$, which means the zener diode 116 can be cutoff.

In one embodiment, if a voltage spike (e.g., 36V) occurs at the power supply terminal 102, e.g., the supply voltage $V_{SP}$ is at a relatively high voltage level, the zener diode 116 can be conducted inversely, and the regulated voltage $V_{PT}$ can be maintained at the voltage level $V_{BE}+V_{116}$. At the same time, the switch 104 can operate in the active region. Therefore, the voltage across the switch 104 can be equal to the supply voltage $V_{SP}$ (e.g., 36V) minus the regulated voltage level $V_{PT}$, and the voltage spike can be prevented at the protected terminal 106.

In one embodiment, the voltage level $V_{BE}+V_{116}$ can be designed to be equal to the normal operation level $V_{NOR}$ (e.g., 14.4V), or to a voltage level that is higher than the normal operation level $V_{NOR}$ (e.g., 14.4V) but lower than the predetermined level $V_{PRE2}$ (e.g., 16V). Since the regulated voltage $V_{PT}$ can be maintained at the voltage level $V_{BE}+V_{116}$, the aforementioned integrated circuits may not be exposed to the high voltage spike (e.g., 36V), and can operate properly.

Figure 2:
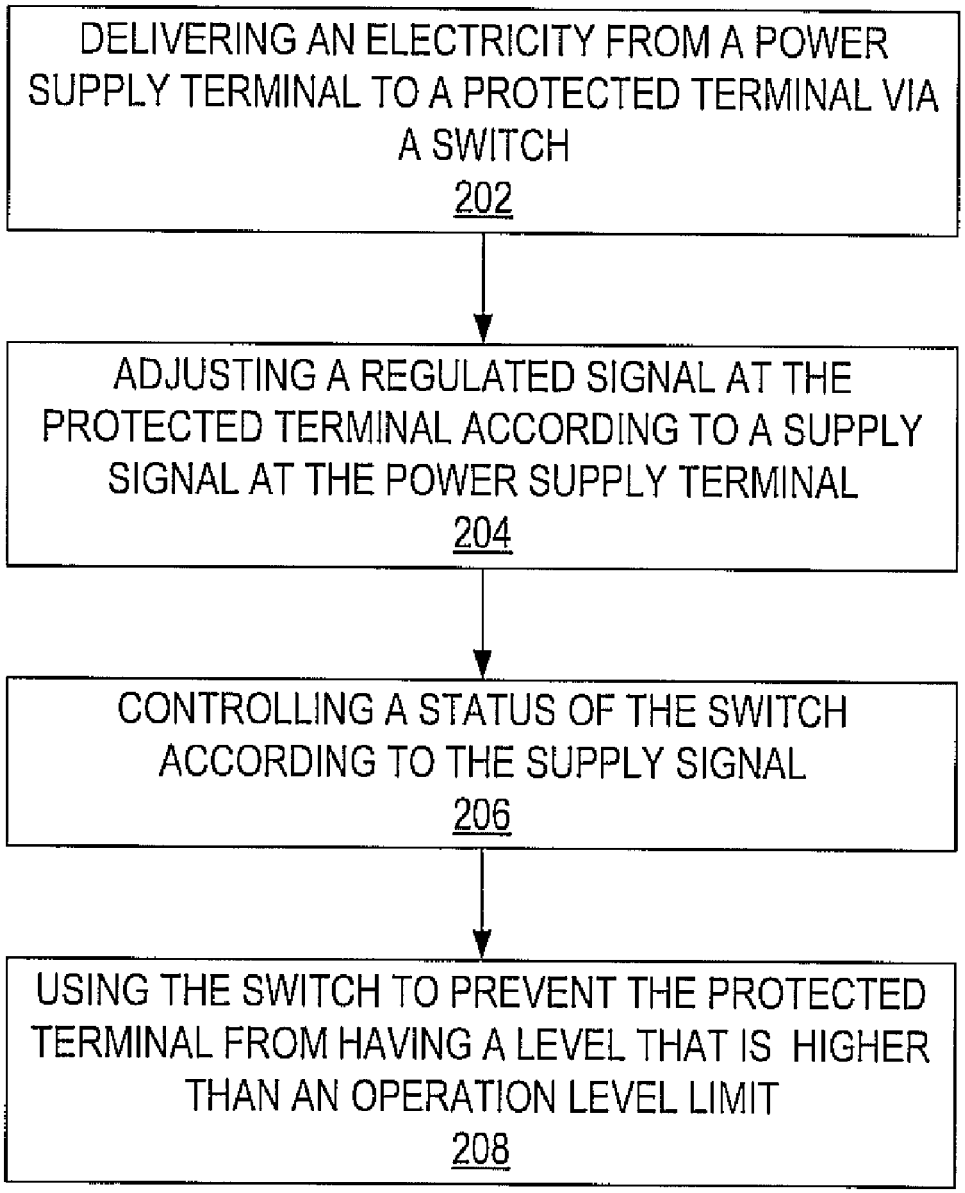
FIG. 2 illustrates a flowchart of examples of operations performed by an electricity delivery system, in accordance with one embodiment of the present invention.

FIG. 2 illustrates a flowchart 200 of examples of operations performed by an electricity delivery system 100 (100'), in accordance with one embodiment of the present invention. FIG. 2 is described in combination with FIG. 1A and FIG. 1B.

In block 202, the switch 104 can be used to deliver electricity, e.g., the supply current $I_{SP}$ or the supply voltage $V_{SP}$, from the power supply terminal 102 to the protected terminal 106. As such, the integrated circuits coupled to the protected terminal 106 can be powered by the regulated signal $V_{PT}$.

In block 204, the regulator 110 can be used to adjust the regulated signal $V_{PT}$ at the protected terminal 106 according to the supply signal $V_{SP}$ at the power supply terminal 102. For example, if a voltage spike having a level that is higher than the maximum operation level $V_{MAX}$ of the integrated circuits occurs on the power supply terminal 102, the regulator 110 can maintain the regulated signal $V_{PT}$ at the normal operation level $V_{NOR}$ of the integrated circuits.

In block 206, the status of the switch 104 can be controlled according to the supply signal $V_{SP}$. For example, if the supply signal $V_{SP}$ is at the normal operation level $V_{NOR}$ (e.g., 14.4V) of the integrated circuits, the switch 104 can be fully turned on, in one embodiment. If the supply signal $V_{SP}$ is at a relatively higher level (e.g., 36V), the switch 104 can operate in the active (saturation) region, in one embodiment. Thus, as described in block 208, the switch 104 can be used to prevent the protected terminal 106 from having a level that is higher than a maximum operation level $V_{MAX}$.

Figure 3:
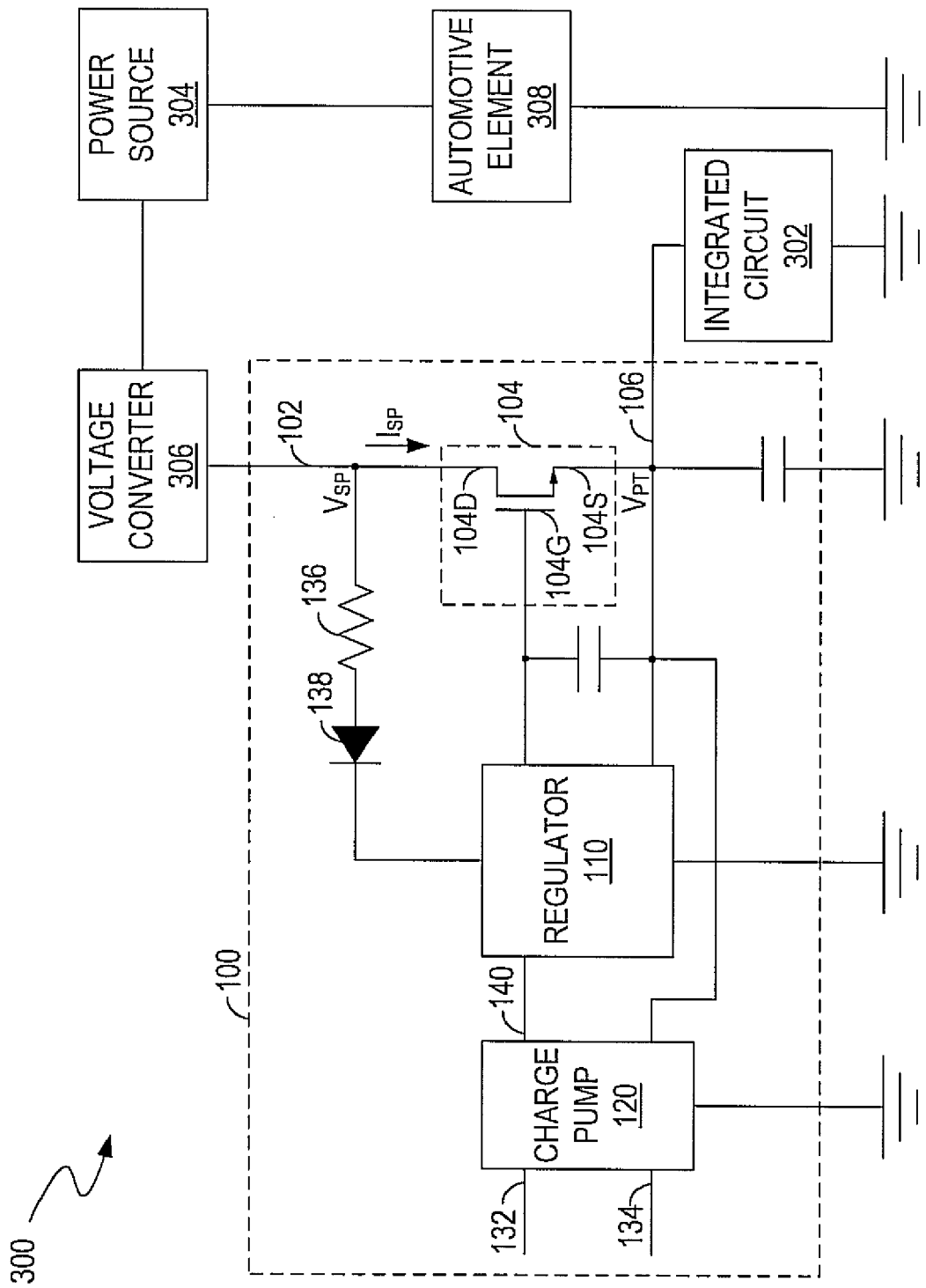
FIG. 3 illustrates a block diagram of an example of an electric system, in accordance with one embodiment of the present invention.

FIG. 3 illustrates a block diagram of an example of an electric system 300 with an electricity delivery circuit 100 (100'), in accordance with one embodiment of the present invention. Elements that are labeled the same as in FIG. 1A and FIG. 1B have similar functions and will not be repetitively described herein.

In the example of FIG. 3, one or more integrated circuits 302 can be coupled to the protected terminal 106 and be powered by a power source 304 (e.g., a battery, an adapter) via a voltage converter 306 and the electricity delivery system 100. In one embodiment, the power source 304 may supply a high voltage (e.g., 36V, 42V, 48V). The voltage converter 306 can receive the high voltage from the power source 304, and generate a step-down voltage at the normal operation level $V_{NOR}$ (e.g., 14.4V) of the integrated circuits 302 to the electricity delivery system 100. At the same time, the switch 104 can be fully turned on by the charge pump 120, such that the regulated signal $V_{PT}$ can be at the normal operation level $V_{NOR}$. As such, the integrated circuits 302 powered by the regulated signal $V_{PT}$ can operate properly.

In one embodiment, the electricity delivery system 100 may receive voltage spikes (e.g., 36V, 42V, 48V) from the power supply terminal 102 in specific situations, e.g., when the electric system 300 operates at the beginning of being enabled. If the electricity delivery system 100 receives a voltage spike (e.g., 36V, 42V, 48V) from the power supply terminal 102, the switch 104 can operate in the active region. Consequently, the regulated signal $V_{PT}$ can be maintained at a level that is lower than the predetermined level $V_{PRE2}$ by the regulator 110, and the voltage across the switch 104 can be equal to the voltage spike level (e.g., 36V, 42V, 48V) minus the regulated voltage level $V_{PT}$. As such, the high voltage spikes can be prevented in the integrated circuits 302.

Moreover, the electric system 308 may also include one or more automotive elements 308 that can be powered by the power source 304 directly. For example, the automotive element 308 can be, but is not limited to, an engine of an electric bike/vehicle. In one embodiment, the integrated circuits 302 are operable for controlling the automotive elements 308.

Accordingly, the present invention provides an electricity delivery system that can deliver electricity to integrated circuits, and meanwhile can prevent voltage spikes in the integrated circuits. The electricity delivery system can be used in many applications, e.g., electric bikes, electric vehicles, etc. The electricity delivery system can be used in electronic/electric systems that are powered by high voltages and that include the integrated circuits. The maximum operation voltage level of the integrated circuits can be lower than the level of the high voltage, such that cost and power consumption can be reduced, and power efficiency can be increased.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. An electronic system comprising:
   a switch operable for delivering electricity from a first terminal to a second terminal, and operable for preventing said second terminal from exceeding a predefined operation level limit; wherein, in response to a signal spike at said first terminal, the gate-source voltage of said switch is controlled to be greater than the threshold voltage of said switch and the gate-drain voltage of said switch is controlled to be less than said threshold voltage; and
   a regulator coupled to said switch and operable for adjusting a regulated signal at said second terminal according to a supply signal at said first terminal.

2. The electronic system as claimed in claim 1, wherein said first terminal is coupled to a power source.

3. The electronic system as claimed in claim 1, wherein said second terminal is coupled to a circuit having said predefined operation level limit.

4. The electronic system as claimed in claim 1, wherein said regulator adjusts said regulated signal to a level that is no greater than said predefined operation level limit if said supply signal is greater than said predefined operation level limit.

5. The electronic system as claimed in claim 1, wherein said switch comprises a MOSFET (metal oxide semiconductor field effect transistor), and wherein said MOSFET operates in an active region if said supply signal is greater than a predetermined level.

6. The electronic system as claimed in claim 1, wherein a level of said regulated signal is approximately equal to a level of said supply signal if said supply signal is less than a predetermined level.

7. The electronic system as claimed in claim 1, wherein said switch is fully turned on if said supply signal is less than a predetermined level.

8. The electronic system as claimed in claim 1, further comprising:
a charge pump coupled to said second terminal and operable for generating a driving signal to control said switch according to said regulated signal.

9. The electronic system as claimed in claim 1, wherein said regulator comprises a zener diode operable for adjusting said regulated signal to a level that is no greater than said predefined operation level limit.

10. The electronic system as claimed in claim 1, wherein said signal spike comprises a voltage spike at 36 volts.

11. A method comprising:
delivering electricity from a first terminal to a second terminal via a switch;
adjusting a regulated signal at said second terminal according to a supply signal at said first terminal;
controlling the gate-source voltage of said switch to be greater than the threshold voltage of said switch in response to a signal spike said first terminal;
controlling the gate-drain voltage of said switch to be less than said threshold voltage in response to said signal spike; and
preventing said second terminal from exceeding a predefined operation level limit using said switch.

12. The method as claimed in claim 11, wherein said second terminal is coupled to a circuit having said predefined operation level limit.

13. The method as claimed in claim 11, further comprising:
controlling said switch to operate in an active region if said supply signal is greater than a predetermined level.

14. The method as claimed in claim 11, further comprising:
adjusting a level of said regulated signal to approximately a level of said supply signal if said supply signal is less than a predetermined level.

15. The method as claimed in claim 11, further comprising:
fully turning on said switch if said supply signal is less than a predetermined level.

16. The method as claimed in claim 11, further comprising:
generating a driving signal according to said regulated signal; and
controlling said switch by said driving signal.

17. An electronic system comprising:
a circuit coupled to a protected terminal; and
an electricity delivery circuit operable for providing electricity to said circuit, said electricity delivery circuit comprising:
a switch operable for delivering said electricity from a power supply terminal to said protected terminal, and operable for preventing said protected terminal from exceeding a predefined operation level limit of said circuit, wherein in response to a signal spike at said power supply terminal, the gate-source voltage of said switch is controlled to be greater than the threshold voltage of said switch and the gate-drain voltage of said switch is controlled to be less than said threshold voltage; and
a regulator coupled to said switch and operable for adjusting a regulated signal at said protected terminal according to a supply signal at said power supply terminal.

18. The electronic system as claimed in claim 17, wherein said regulator adjusts said regulated signal to a level that is no greater than said predefined operation level limit if said supply signal is greater than said predefined operation level limit.

19. The electronic system as claimed in claim 17, wherein said switch comprises a MOSFET (metal oxide semiconductor field effect transistor), and wherein said MOSFET operates in an active region if said supply signal is greater than a predetermined level.

20. The electronic system as claimed in claim 17, wherein said switch is fully turned on if said supply signal is less than a predetermined level.

21. The electronic system as claimed in claim 17, further comprising:
a charge pump coupled to said protected terminal and operable for generating a driving signal to control said switch according to said regulated signal.

22. The electronic system as claimed in claim 17, wherein said regulator comprises a zener diode operable for adjusting said regulated signal to a level that is no greater than said predefined operation level limit.

* * * * *